US011244381B2

(12) United States Patent
Kline et al.

(10) Patent No.: US 11,244,381 B2
(45) Date of Patent: Feb. 8, 2022

(54) COLLABORATIVE VIRTUAL REALITY COMPUTING SYSTEM

(71) Applicant: INTERNATIONAL BUSINESS MACHINES CORPORATION, Armonk, NY (US)

(72) Inventors: Eric Vance Kline, Rochester, MN (US); Sarbajit Kumar Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 83 days.

(21) Appl. No.: 16/106,609

(22) Filed: Aug. 21, 2018

(65) Prior Publication Data
US 2020/0065889 A1 Feb. 27, 2020

(51) Int. Cl.
*G06Q 30/06* (2012.01)
*H04L 29/06* (2006.01)
(Continued)

(52) U.S. Cl.
CPC ......... *G06Q 30/0643* (2013.01); *G06F 3/017* (2013.01); *G06F 3/167* (2013.01);
(Continued)

(58) Field of Classification Search
CPC ..... G06Q 30/0643; G06F 16/71; G06F 3/017; G06F 3/167; H04L 67/14; H04L 67/38
(Continued)

(56) References Cited

U.S. PATENT DOCUMENTS

| 7,647,247 B2 | 1/2010 | Abraham et al. |
| 2007/0192203 A1* | 8/2007 | Di Stefano ........ G06Q 30/0643 705/26.8 |

(Continued)

OTHER PUBLICATIONS

Anonymous, Teleoperating robots with virtual reality: Making it easier for factory works to telecommute, Oct. 4, 2017, Massachusetts Institute of Technology, CSAIL, Science Daily, www.sciencedaily.com/releases/2017/10/171004142706.htm, pp. 1-2. (Year: 2017).*

(Continued)

*Primary Examiner* — Jason B Dunham
*Assistant Examiner* — Brittany E Bargeon
(74) *Attorney, Agent, or Firm* — Gregory M. Nordstrom

(57) ABSTRACT

A method comprises a computer-implemented virtual reality (VR) system connecting VR devices in a collaborative VR session. The VR devices are associated with participants in a collaborative activity to perform an ordered procedure directed to a real-world assembly. The VR system receives session inputs from VR devices associated with the participants. The session inputs correspond to actions of the participants to modify a virtual object included in a VR expression of the VR session. The virtual object corresponds to the real-world assembly. In response to the session inputs, the VR system performs a transaction directed to the virtual object, which produces modifications of the real-world assembly corresponding to the modifications of the virtual object. A collaborative VR system can comprise a VR server and VR devices configured to perform the method. A computer program product can instruct processors of a VR system to perform the method.

15 Claims, 3 Drawing Sheets

(51) Int. Cl.
*G06F 3/01* (2006.01)
*G06F 3/16* (2006.01)
*H04L 29/08* (2006.01)
*G06F 16/71* (2019.01)

(52) U.S. Cl.
CPC .............. *G06F 16/71* (2019.01); *H04L 67/14* (2013.01); *H04L 67/38* (2013.01)

(58) Field of Classification Search
USPC ......................................................... 705/27.2
See application file for complete search history.

(56) References Cited

U.S. PATENT DOCUMENTS

| | | | |
|---|---|---|---|
| 2010/0030578 A1 | 2/2010 | Siddique et al. | |
| 2010/0185514 A1* | 7/2010 | Glazer | G06Q 30/0603 705/14.51 |
| 2012/0072304 A1* | 3/2012 | Homan | G06Q 30/0633 705/26.8 |
| 2013/0211953 A1 | 8/2013 | Abraham et al. | |
| 2014/0100997 A1* | 4/2014 | Mayerle | G06Q 30/0276 705/27.2 |
| 2014/0149264 A1* | 5/2014 | Satyanarayana | G06Q 30/06 705/27.2 |
| 2015/0186154 A1 | 7/2015 | Brown et al. | |
| 2016/0350973 A1* | 12/2016 | Shapira | G06F 3/011 |
| 2017/0324841 A1* | 11/2017 | Clement | H03G 3/3042 |
| 2018/0152522 A1* | 5/2018 | White | G06Q 20/12 |
| 2018/0174122 A1* | 6/2018 | Mattingly | G06Q 20/223 |
| 2018/0204383 A1* | 7/2018 | Licht | G06Q 20/18 |
| 2018/0324229 A1* | 11/2018 | Ross | G06T 19/006 |
| 2018/0356895 A1* | 12/2018 | Dailey | A61B 34/77 |
| 2019/0004688 A1* | 1/2019 | Bowen | G06F 11/60 |
| 2019/0250805 A1* | 8/2019 | Brewer | G06F 3/0482 |
| 2019/0380792 A1* | 12/2019 | Poltaretskyi | A61B 5/1122 |

OTHER PUBLICATIONS

Z. Pan, "Collaborative shopping based on multi-agent in virtual environments," 8th International Conference on Computer Supported Cooperative Work in Design Proceedings, 2004, vol. 2. pp. 386-391.

IBM, "Collaborative Web Shopping Experience." IP.com Disclosure No. IPCOM000167113D, Original Publication Date: Jan. 30, 2008.

* cited by examiner

COLLABORATIVE VIRTUAL REALITY COMPUTING SYSTEM

BACKGROUND

The present disclosure relates to computing systems and, more specifically, to computing systems including virtual reality devices.

SUMMARY

According to embodiments of the present disclosure, a computer-implemented method comprises a computer-implemented virtual reality (VR) system connecting VR devices in a collaborative VR session. The VR devices are associated with participants in a collaborative activity to perform an ordered procedure. A virtual expression of the collaborative VR session includes a virtual object representative of a real-world assembly. The method includes the VR system receiving a session input from a VR device associated with a first participant in the VR session. The session input comprises an action of the first participant corresponding to a task of the ordered procedure directed to a first modification of the virtual object.

The method further comprises receiving a second session input from a VR device associated with a second participant in the VR session. The second session input comprises an action of the second participant corresponding to a second task of the ordered procedure directed to a second modification of the virtual object. According to the method, in response to the receiving the session inputs the VR system performs a transaction, in the VR session, directed to the virtual object in association with the real world object. The VR system performing the transaction produces modifications of the real-world assembly corresponding to the modifications of the virtual object.

A collaborative VR system comprises a computer implemented VR server, a VR system input device coupled to the server, and VR devices coupled to the VR server. The VR system can perform the method.

Methods of the disclosure can be embodied as a computer program product for performing the collaborative activity in a computer-implemented VR system.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
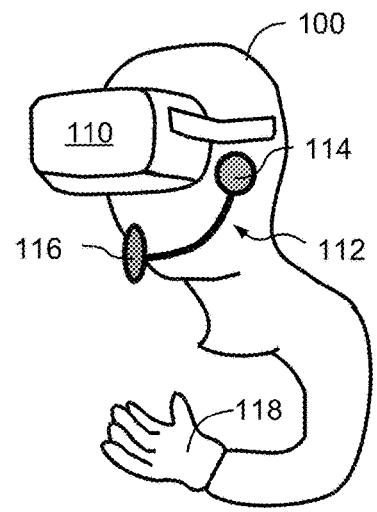
FIG. 1A illustrates example Virtual Reality (VR) devices, according to aspects of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to collaborative computing systems. More particular aspects relate to collaborative computing systems that incorporate Virtual Reality devices. While the present disclosure is not necessarily limited to such applications, various aspects of the disclosure may be appreciated through a discussion of various examples using this context.

Virtual reality (VR) can describe the use of electronic and/or electro-mechanical devices to present a virtual representation of real-world (e.g., actual, or physical) objects and/or human sensory experiences. VR devices can present, to a human user, a virtual representation of a real-world person, place, or object, as well as virtual representations of interactions of real-world persons, places, and/or objects. As used herein, a "VR device" comprises any type of computing, electronic, and/or electro-mechanical device capable of presenting a human sensory perception to human user of the VR device, and/or capable of detecting a motion and/or receiving an input, from a human user (e.g., capable of detecting a bodily gesture or motion, and/or receiving a spoken voice input).

The advent of VR, and VR devices, in computing systems offers new opportunities for humans to collaborate on, and/or jointly participate in, an activity, using virtual representations of actual, real-world objects in lieu of collaboration on, or joint participation in, an activity performed while co-located in real-world locations and/or directly manipulating real-world objects. In embodiments of the disclosure (hereinafter, "embodiments"), a "collaborative VR system" can comprise one or more VR devices that are connected to (or, otherwise interface with) one or more computing systems and/or other VR devices. Accordingly, a collaborative VR system, in embodiments, can comprise a computing system that can connect one or more VR devices, worn and/or used by participants (e.g., human participants) in a "collaborative VR session", to enable the participants to jointly perform, or otherwise participate in, a collaborative activity.

As used herein, "collaborative activity" refers to any task or activity that can be performed collectively, and/or collaboratively, by a group of participants. For example, a collaborative activity can include a group of participants collaborating to shop for items for one or more participants in the group. A collaborative activity can include a group of participants simulating (e.g., to practice) or, performing, a collaborative task, such as simulating or performing, in the collaborative VR session, a procedure on a real-world subject or object such as, performing a medical procedure, assembling a machine or article of manufacture, or performing a construction project. While the disclosure generally relates to human participants in a collaborative activity, this is not intended to limit embodiments. It would be apparent to one of ordinary skill in the art that a participant can also include non-human users of VR devices (e.g., artificially intelligent computing systems) that can perceive human sensory stimuli and can interact with other participants in response to that stimuli.

A "collaborative VR session", as used herein, refers to a connection, in a collaborative VR system, of VR devices associated with, and/or used by, one or more of a group of participants (e.g., humans using and/or wearing VR devices) to enable the participants to perform a collaborative activity. In embodiments, objects of a collaborative activity performed in a collaborative VR session can correspond to real-world objects, and interactions of participants and/or objects in a collaborative VR session can correspond to real-world interactions of real-world participants and/or objects. As used herein, in the context of collaborative VR systems and/or sessions, "object" refers to any object (e.g., a participant, location, or subject of an action) associated with a collaborative activity, and/or a task in a collaborative activity, performed in a collaborative VR session.

In embodiments, a collaborative VR session can comprise "VR expressions", which can represent one or, alternatively, a collection of particular elements (e.g., participants, objects, locations, and/or interactions) of, or associated with, a collaborative activity. The collaborative VR system can present such VR expressions to VR devices connected in a collaborative VR session. The VR devices presenting the VR expressions can, in turn, provide participants in the collaborative VR session (e.g., through VR devices used by the participants) with sensory stimuli that give the participant(s) a sensation, and/or impression, of being present (individually or, alternatively, collectively) at a particular real-world location and/or interacting with real-world objects (and/or other participants) associated with performing the collaborative activity.

In embodiments, a session VR expression can include one or more of a "participant VR expression", an "object VR expression", a "location VR expression", and an "action VR expression". A participant VR expression, in an embodiment, can comprise one or more sensory VR expressions representing a participant in a collaborative activity. An object VR expression, in an embodiment, can comprise one or more sensory VR expressions representing an object present in, or associated with, a collaborative VR activity. A location VR expression, in an embodiment, can comprise one or more sensory VR expressions representing a location of a collaborative VR activity. An action VR expression, in an embodiment, can comprise one or more sensory VR expressions representing an interaction among one or more participants, and/or objects, in a collaborative VR session.

Sensory VR expressions, in embodiments, can comprise human sensory perceptions representing particular elements of a collaborative activity. Sensory VR expressions can comprise, for example, visual (e.g., 3-dimensional, or "3D" images), auditory (e.g., sounds), somesthetic (e.g., pressure or temperature), haptic (e.g., touch), and/or proprioceptive (e.g., bodily position, or movement) expressions. Sensory VR expressions, representing elements of a collaborative activity and presented to a participant on one or more VR devices, can collectively, in an embodiment, provide a participant with a sensation of performing the activity in the real-world.

To illustrate, in an embodiment a collaborative VR system can connect a group of participants in a collaborative VR session to perform a collaborative shopping activity. Such a collaborative VR shopping session can, for example, enable two or more shoppers to compare actual products together, and to make joint purchases of actual products, within the context of the collaborative VR session and without having to physically co-locate at a merchant location or directly manipulate actual, physical items for purchase. In this example, using the VR devices participants in the collaborative VR shipping session (represented in a session VR expression by participant VR expressions) can locate at a particular merchant location (represented in a session VR expression by a location VR expression); collectively examine, compare, select items for purchase (represented in a session VR expression by object VR expressions); associate selected items with particular participants; and/or perform a financial transaction (e.g., pay for an item for purchase, and/or exchange funds among the participants). Interactions in this example collaborative VR shopping session—such as selecting product, associating products with participants, and/or performing transactions—can be represented, in a session VR expression, by action VR expressions.

In an embodiment, VR expressions representing, in a collaborative VR session, participants, objects, locations, and/or interactions of a collaborative activity can be, or can correspond to, real-world persons, objects, locations, and/or interactions. For example, in the foregoing example collaborative VR shopping session, participants (e.g., shoppers and/or sales clerks), objects (e.g., items for purchase), locations (e.g., merchant locations and/or displays), and/or interactions (e.g., moving among merchant locations, selecting and/or paying for items for purchase) in the collaborative VR session can be, or correspond to, real-world persons (e.g., actual shoppers and/or clerks), objects, (e.g., actual items for sale), locations (e.g., actual stores, departments, or shelves of merchandise), and/or interactions (e.g., physically moving to different departments within an actual store, performing actual financial transactions to acquire an item for sale).

In another example, in an embodiment a collaborative VR system can connect a group of participants in a collaborative VR medical session to collectively (and/or, collaboratively) participate in a simulation of a medical procedure, such as a surgical procedure performed on a human (or, alternatively, animal) patient. In embodiments, such a collaborative VR medical session can be used, for example, to train or prepare medical professionals to collaboratively perform a procedure, such as to "practice" a procedure, either generically (e.g., on any human or animal) or, alternatively, to perform a procedure on a particular actual patient based on information particular to that patient (e.g., information drawn from patient medical images and used to generate VR representations of the patient). Similar to the foregoing example collaborative VR shopping session, in this example a session VR expression can include participant VR expressions representing, for example, a surgeon or a patient; object VR expressions representing, for example, surgical instruments, a patient, or an anatomical feature of a patient; location VR expressions representing, for example, a clinic, hospital, or operating room; and/or action VR expressions representing, for example, performing a task or step of the procedure.

As described in the previous example collaborative VR shopping session, in this example the participants, objects, locations, and/or interactions represented by the VR expressions in the collaborative VR session can be, or correspond to, real-world persons (e.g., actual surgeons and/or patients), objects (e.g., actual organs of a patient, actual surgical instruments), locations (e.g., actual operating rooms), and/or interactions (e.g., actual steps in a medical procedure involving an actual patient).

In a further example, a collaborative VR system, in an embodiment, can connect a group of participants in a collaborative VR project session to collectively (and/or, collaboratively) perform, for example, a construction project, or assembly of a machine or device. In embodiments, such a collaborative VR project session can be used, for example, to train or prepare workers to collaboratively perform a project, or to test particular steps, methods, or tools in a collaborative construction or assembly project. As used herein, the term "assembly" means an article of manufacture, device, or machine, partially or completely, assembled from a set of components. For example, an assembly can be a consumer product or other article of manufacture, or can be an electrical/electronic or mechanical device or machine. Similarly, as used herein, "structure", in the context of a construction procedure or activity, means a civil structure, such as a building or a transportation structure (e.g., a bridge, railway, or tunnel). Correspondingly, as used herein, "real-world assembly" means a tangible instance (e.g., an object that can be held or touched) of an assembly as it exists in the real (as opposed to virtual) world; and, "real-world structure" means a tangible instance of a structure, as it exists in the real (as opposed to virtual) world.

Additionally, as used herein, the term "ordered procedure" means a procedure comprising a set of tasks that are performed in a particular, prescribed order. For example, assembling (or, otherwise modifying) a real-world assembly (e.g., a tangible article of manufacture) can comprise an ordered procedure to assemble components of the assembly in a particular order. Constructing (or, otherwise modifying) a real-world structure (e.g., a building) can comprise an ordered procedure to join components of the building in a particular order. As just described, participants in a collaborative VR session can perform tasks of an ordered procedure to assemble or modify (in an ordered manner) an assembly; construct or modify (in an ordered manner) a structure; to experiment with production or modification of an assembly, or construction or modification of a structure; and/or, to train a participant (including a non-human participant, such as a component of a VR system) to perform a task of the procedure.

In embodiments, participants in a collaborative VR session can perform particular, individual tasks of an ordered procedure, directed to virtual representations of objects (e.g., tools, components, an assembly, and/or a structure), with one participant performing one particular task and other participants performing other particular tasks to collaboratively perform the procedure. For example, a session VR expression can include participant VR expressions representing, for example, a construction, or assembly worker; object VR expressions representing, for example, a tool, machine, or component of a structure or assembly; location VR expressions representing, for example, a construction site or factory floor; and/or action VR expressions representing, for example, constructing a civil structure, or assembling an article of manufacture. As previously described in reference to the example collaborative VR shopping and medical sessions, in such an embodiment the participants, objects, location, and/or interactions represented by the VR expressions in the collaborative VR session can be, or correspond to, real-world persons (e.g., workers), objects (tools, machines, or components of a structure or an assembly), locations (e.g., a construction or manufacturing site), and/or interactions (e.g., workers collaboratively constructing a structure, or assembling a device). The participants in a collaborative VR session can perform tasks of an ordered procedure directed to virtual objects, and the VR system can, in the VR session, transform the actions of the participants that modify the virtual objects to actions that modify corresponding real-world objects (e.g., a real-world assembly or structure).

It will be understood from the disclosure, by one of ordinary skill in the art, in embodiments a collaborative VR system can connect a group of participants in a collaborative VR session to collectively (and/or, collaboratively) participate in a variety of human activities. It will be further evident to one of ordinary skill in the art that, in embodiments, participants, objects, locations, and/or interactions included in a collaborative VR session can correspond to real-world participants, objects, locations, and/or interactions associated with that particular collaborative activity.

It would be apparent to one of ordinary skill in the art that a VR expression, such as just described, can represent any singular or collective aspect of a shared and/or collaborative activity, and can be, but is not limited to, any or, any combination, of the foregoing examples of VR expressions. Accordingly, as used herein, "VR expression" refers to any single or combination of VR representations of a human sensory expression that a collaborative VR system can present on a VR device, in a collaborative VR session, as representing a person, spatial location, action, and/or thing, included in a collaborative activity, such as the foregoing examples.

Collaborative VR sessions can further include, in embodiments, participants providing inputs to a collaborative VR system, and the participant inputs can cause the collaborative VR system to modify a session VR expression, and/or to take an action on a participant, object, or location within a collaborative VR session. An input, in an embodiment, can comprise, for example, a voice command, a keyboard input, or a gesture or motion input.

In response to an input, modifying a session VR expression, in an embodiment, can comprise modifying one or more of a participant, object, location, or action VR expression included in a session VR session, such as to represent an action taken involving a participant, object, location in a collaborative VR session. In embodiments, a collaborative VR system can present the modified VR expression(s) to VR devices associated with one or more of the participants, and an action taken, by a collaborative VR system, in a collaborative VR session, can include taking an actual action in the real world (e.g., making a real-world payment for an item for purchase, and/or arranging real-world delivery of an actual item to an actual participant).

As previously described, in embodiments VR devices can present one or more VR expressions to a participant, and the VR expressions can include various sensory VR expressions. To illustrate, but not intended to limit embodiments, a VR device can comprise one or more of a wearable visual display; a wearable audio device; and/or a wearable somesthetic, haptic, and/or proprioceptive device. Such VR devices, in embodiments, can present VR expressions to a participant wearing or, otherwise using, the device(s).

Additionally, in embodiments a VR device can receive an input from a participant. For example, a VR device (e.g., a microphone) can receive a spoken voice input (e.g., a command or directive), and/or detect a motion of a participant (e.g., pointing a finger, or waving a hand or arm). In embodiments, the VR devices can communicate the input to a collaborative VR system, and the collaborative VR system can modify elements of the collaborative VR session (e.g., VR expressions) and/or perform real-world actions, or operations, (e.g., perform a financial transaction) on real-world objects associated with the collaborative activity performed in a collaborative VR session.

FIG. 1A depicts example VR devices that can be employed in an embodiment. In FIG. 1A, wearable VR devices 110, 114, 116, and 118, which, in an embodiment, can be VR devices a participant, shown in FIG. 1A as 100, can wear, or otherwise use, and that can connect to a collaborative VR system. In an embodiment, VR device 110 can be a wearable visual device (e.g., VR "goggles" or "glasses") capable of displaying, or otherwise presenting, a visual VR expression, such as a visual VR expression of a participant, object, and/or location associated with a collaborative activity. In an embodiment, a visual VR expression can be, for example, a 3-dimensional (3D) visual image. Such a visual VR expression can provide a participant wearing the display with a visual perception, for example, of being "at a location", or a visual perception of a location surrounding a participant.

In the example of FIG. 1A, but not intended to limit embodiments, auditory VR device 114 and voice VR device 116 are depicted as components of wearable headset 112. In this example, auditory VR device 114 can be an earphone or, alternatively, an earbud or, a pair of earphones or earbuds. In an embodiment, an auditory VR device, such as 114, can present auditory VR expressions (e.g., sounds) to a participant wearing headset 112. In alternative embodiments, an auditory device need not be wearable and can be, for example, a speaker, such as a speaker included in a laptop computer, or a speaker located in a room with a participant. In other embodiments, an auditory VR device can include a sound-to-text (e.g., a voice-to-text or hearing-impaired caption) device which can present visually, to a participant (e.g., on a visual device, such as 110) text or captions corresponding to auditory VR expressions, In an embodiment, voice VR device 116 can be a microphone, and can receive voice (e.g., speech) input from a participant wearing headset 112. In alternative embodiments a voice VR device can comprise other devices, such as a microphone not worn by a participant, or a device that can translate text input from a text device (e.g., a keyboard) to speech that can be input to a collaborative VR system. In embodiments, input from a voice VR device, such as 116, can comprise speech received by the collaborative VR system from a participant, and the collaborative VR system can present that speech to one or more other participants, such as to facilitate a conversation among the participants participating in a collaborative VR session.

Alternatively, input from a voice VR device, such as 116, can comprise voice commands to the collaborative VR system. In embodiments, voice input from a participant can comprise voice commands directed to one or more computers in a collaborative VR system, such as commands to select particular elements (e.g., a location of a merchant, or an item for purchase presented at a merchant location) represented in a collaborative VR session by one or more types of sensory VR expressions in a session VR expression. Voice commands can comprise, for example, commands to alter a visual expression (e.g., change a location, or a view of a location), or to perform a particular action (e.g., to invite another participant to participate in a collaborative VR session, or perform a transaction regarding an element of a VR expression or, alternatively, a collaborative activity, in a collaborative VR session).

Embodiments can include somesthetic, haptic, and/or proprioceptive VR devices. In embodiments, such devices can be capable of presenting to a participant to a somesthetic, haptic, and/or proprioceptive sensation included in a sensory VR expression, and/or sensing a motion and/or gesture of a participant (e.g., a turn of the wearer's head, a motion of a wearer's eye, hand, and/or finger) associated with an interaction in a collaborative VR session. In FIG. 1A, VR device 118 depicts a "VR glove", which can, in an embodiment, be a somesthetic, haptic, and/or proprioceptive VR device that can present, to participant 100, wearing glove 118, a somesthetic, haptic, and/or proprioceptive sensory VR expression, such as a sensation of pressure and/or temperature, and/or can detect a motion, or gesture, of participant 100 wearing glove 118.

In embodiments, other VR devices can be capable of detecting motion and/or position, and/or presenting such sensory VR expressions. For example, in an embodiment visual VR device 110 can sense a motion of a participant, such as participant 100, turning their head, and/or looking upward or downward. In another example, visual VR device 110 can present a somesthetic VR sensation to participant 100, such as presenting heat on the face of participant 100 to accompany a visual VR display of the sun. In embodiments a VR device—such as 110, 114, 116, and/or 118 of FIG. 1A—can comprise computing devices, sensatory-producing and/or sensatory-detecting devices, electronic devices, mechanical devices, and/or electro-mechanical devices, or any combination of such devices as would be understood by one of ordinary skill in the art to be within the scope of the disclosure.

The VR devices shown in FIG. 1A are intended only to illustrate the disclosure, but are not intended to limit embodiments. It would be apparent to one of ordinary skill in the art that the disclosure can encompass any of a variety of devices capable of presenting one or more sensory VR expressions corresponding to a human sensory experience, and/or detect human bodily and/or physical actions. Further, it would be apparent to one of ordinary skill in the art that VR devices can comprise devices or, combinations of devices, that are not wearable. Accordingly, as used herein, "VR device" refers to any device (e.g., an electronic, and/or electro-mechanical device, or combination thereof) that can present one or more sensory VR expressions to a participant, and/or detect participant physical actions or inputs (e.g., touch or speech), including wearable devices and/or non-wearable devices, or combinations thereof.

Figure 1B:
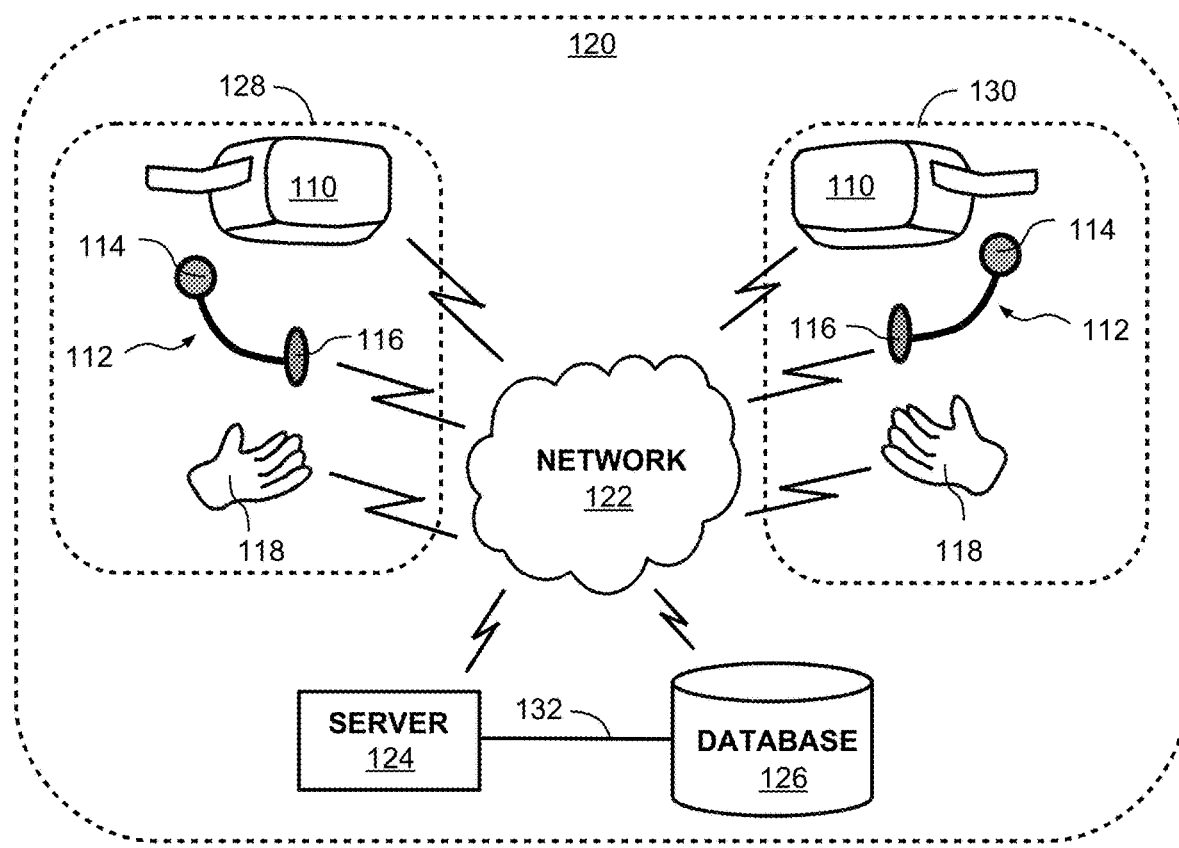
FIG. 1B illustrates an example collaborative computing system, according to aspects of the disclosure.

As previously described, a collaborative VR system can comprise one or more computing devices (and/or components of a computing system) interconnected with one or more VR devices associated with particular participants in a collaborative VR session. FIG. 1B illustrates an example embodiment of a collaborative VR system, 120, using VR devices depicted in FIG. 1A as examples of VR devices that can be included, in embodiments, in a collaborative VR system. However, depiction in FIG. 1B of the VR devices of FIG. 1A is only to illustrate example collaborative VR system 120, and is not intended to limit embodiments.

FIG. 1B depicts collaborative VR system 120 comprising server 124, network 122, (optional) database 126, and participant VR device sets 128 and 130, each comprising respective devices 110, 112, and 118 of FIG. 1A. Following the example of FIG. 1A, in FIG. 1B each of VR devices 112 included in respective VR device sets 128 and 130 can be a wearable headset comprising respective earphone 114 and microphone 116. For purposes of illustrating example collaborative VR system 120 in FIG. 1B, but not intended to limit embodiments, each of VR device sets 128 and 130, in FIG. 1B, can be understood to be utilized (e.g., worn) by a respective participant, not shown in FIG. 1B, such as participant 100 in the example of FIG. 1A. VR devices among VR device set 128 can be utilized by one participant (hereinafter, "participant 128"), and VR devices among VR device set 130 can be utilized by another participant (hereinafter, "participant 130"), in a collaborative VR session hosted by (e.g., "operated" by) collaborative VR system 120.

As illustrated by the example of system 120, in embodiments a collaborative VR system can comprise one or more participant VR devices connected to one or more server computers (hereinafter, collectively, a "server"), and the server can establish (e.g., connect VR devices) and operate (e.g., present VR expressions and/or receive VR device inputs) a collaborative VR session. A server, as used herein, comprises any computing device, and/or combination of computing devices, that can obtain and/or generate VR expressions, suitable for participants' VR devices to present to a participant VR expression corresponding to elements of a collaborative VR session. Accordingly, in embodiments, a server can be a computer dedicated to operations of a collaborative VR system or, alternatively, can be a combination of computers and/or computing devices configured to participate in operations of a collaborative VR system.

In embodiments, a collaborative VR system can interconnect elements (e.g., components) of the system using a network. Elements of a collaborative VR system, in embodiments, can connect to a network wirelessly (e.g., using Bluetooth, and/or WIFI). To illustrate, FIG. 1B depicts server 124, database 126, and VR devices 110, 112 (inclusive of earphone 114 and microphone 116), and 118 of each of VR device sets 128 and 130 as connected wirelessly by means of network 122. In the example of FIG. 1B, VR devices among VR device sets 128 and 130 can communicate with server 124, and server 124 can communicate with database 126, through network 122. In embodiments, VR devices can optionally communicate with each other, such as devices among VR device sets 128 and/or 130 communicating (e.g., through network 122, or directly by other means) with each other. A network interconnecting elements of a collaborative VR system, in an embodiment, can be any kind of network suitable for interconnecting electronic devices, such as computing devices and/or VR devices. Such a network can be, for example, a local area or wide area network, or the Internet.

However, this is not intended to limit embodiments, and it would be apparent to one of ordinary skill in the art to alternatively connect any, or all, elements to a network, such as 122, using wires (e.g., Ethernet, or USB, cables) and/or alternative forms of networks. Further, it would be apparent to one of ordinary skill in the art that elements of a collaborative VR system need not interconnect through a network, and can, alternatively, that such elements can connect to one or more other elements of a collaborative VR system directly. For example, any of devices 110, 114, 116, and 118 of either or both of VR device sets 128 and 130 can, in an embodiment, connect directly to server 124 and/or to each other, and/or server 124 can connect directly to database 126, as shown by interface 132.

In embodiments, a server can establish and/or operate a collaborative VR session. Establishing a collaborative VR session can comprise, in embodiments, a server responding to an input (e.g., a spoken request, or a motion or gesture) received from a participant to connect VR devices (and/or participants, associated with VR devices) in the collaborative VR session. Alternatively, a server can establish a collaborative VR session, in embodiments, in response to other inputs and/or stimuli, such as an input or stimulus from a program (e.g., a scheduling program) executing on the server, or executing on another computing device connected to a server, or such as an Internet communication directed to the server (e.g., a participant selecting a merchant from an Internet browser program).

To illustrate, using the example of FIG. 1B, participant 128 wearing headset 112 of VR device set 128 can speak a voice command into VR device set 128 microphone 116 to establish a collaborative VR session, and VR device set 128 microphone 116 can transmit that command through network 122 to server 124. The voice command can comprise parameters of the session, such as a location at which participant 128 wishes to perform a shopping activity, and identification of participant 128 to include in the shopping activity. In embodiments, establishing the VR session can include connecting (e.g., by means of wireless connections through network 122 to server 124) one or more of VR devices in VR device set 130 to the collaborative VR session hosted by server 124.

In response, server 124 can transmit to participant 128, by means of network 220 connected to one or more VR devices among VR device set 128, an invitation to join the collaborative VR session. For example, server 124 can send, by means of network 220, a visual and/or an auditory VR expression to VR devices among VR device set 128 corresponding to an invitation to participant 128 join the session. The VR expression(s) can comprise, for example, a VR expression of participant 128 (e.g., a 3D image and/or voice of participant 128) presented from server 124 VR device set 128 visual display 110 and/or earphone 114. Participant 128 can, in turn, respond to the invitation by speaking a voice response (e.g., "join me", or "hello, yes, I will join") into VR device set 128 microphone 116, which can communicate the response to server 124 and/or VR devices among VR device set 128 through network 122.

In embodiments, a collaborative VR system can present content of a collaborative VR session, such as VR expressions previously described, to participants by means of VR devices worn by participants. Accordingly, establishing a collaborative VR session, in embodiments, can further include a collaborative VR system presenting, on VR devices of one or more participants, VR expressions of elements of a collaborative VR session. For example, as previously described, establishing a session can include a collaborative VR system presenting session VR expressions—which, as previously described, can comprise sensory VR expressions representing participants, object, locations, and/or actions in the collaborative VR session—to one or more participants' VR devices.

Operating a VR session, in embodiments, can comprise a server responding to inputs (e.g., participant voice commands, participant motions and/or gestures) received from a participant VR device (e.g., one or more 110, 114, 116, and/or 118 of each of VR device sets 128 and 130 in FIG. 1B). Responding to such inputs, in an embodiment, can include the server modifying, or obtaining modified versions of, one or more VR expressions and presenting these VR expressions to participants' VR devices by means of participant VR devices connected to the server, such as VR devices among VR device sets 128 and 130, connected to server 124 through network 220.

In embodiments, a server can optionally utilize a VR collaborative activity database in establishing, and/or operating, a collaborative VR session. For example, in FIG. 1B, server 124 can utilize optional database 126 can be a VR collaborative activity database, and server 124 can optionally utilize database 126 in establishing, and/or operating, a collaborative VR session. As depicted in FIB. 1B, server 124 can connect to, and/or access, database 126 through network 220 or, alternatively, by connection 132 to database 126.

In an embodiment, a VR collaborative activity database can include VR expressions, and/or information that can be used by a collaborative VR system to generate VR expressions, representing elements of a collaborative VR session.

For example, a VR collaborative activity database can include VR expressions of a participant (e.g., a 3D image of the participant), and/or a location of a collaborative activity performed in a collaborative VR session. Alternatively, or additionally, a VR collaborative activity database can include participant information, such as pictures, voice recordings, or other indicia, corresponding to a participant, and a collaborative VR system (e.g., a server, or other processor or computing device, in a collaborative VR system) can utilize the participant information to generate one or more VR expressions (e.g., a visual VR expression) corresponding to a participant in a collaborative VR session. In another example, a VR collaborative activity database can include information, such as pictures, sound recordings, or other indicia (e.g., a merchant logo), corresponding to a location at which an activity can occur, and a server can utilize the information to generate one or more VR expressions (e.g., a visual VR expression) corresponding to that location for use in a collaborative VR session.

A server operating (or, participating in) a collaborative VR session can communicate VR expressions (e.g., session VR expressions, and/or component VR expressions included in a session VR expression) to one or more participant VR devices, and the VR devices can present one or a series of VR expressions to a participant to provide the participant, for example, with an impression of physically participating in an activity or task associated with the session. Using the example of a collaborative VR shopping session, a server operating the VR session can communicate to one or more participants VR expressions that can provide the participant(s) with the impression (e.g., by presenting various associated VR expressions) of being physically at a location of a store, and/or physically manipulating an object at that location (e.g., picking an object from a shelf and examining the object 3-dimensionally). In embodiments, a collaborative VR system (e.g., a server included therein) can present a sequence, or series, of VR expressions on VR of multiple participants to provide participants the impression of shopping in the presence of, and/or in collaboration with, other participants.

As previously described, in embodiments a server can respond to an input (which can be a single input or, alternatively, a series of inputs) from one or more VR devices. The input can be associated with an action directed to an element of a VR expression in the collaborative VR session. In embodiments, an input to a server can include an input from a participant VR device—such as a voice command, or a participant gesture or motion, presented by a VR device—and/or an input from a computing system incorporated into a VR activity (e.g., a computing system having information to provide elements of a VR expression). For example, an input from a participant VR device, or component thereof, can be a motion input (e.g., turning a participant's head, detected by a visual VR device, and/or a participant pointing with a hand or finger detected by a somesthetic device such as a VR glove). In another example, an input can be a voice input, such as a voice command spoken by a participant into a VR headset microphone.

In response to such an input, a server can alter VR expressions presented to a participant by a VR device. For example, a server can receive an input corresponding to a proprioceptive VR device (e.g., a device included in a VR goggles device that can sense position of the VR goggles) detecting a participant turning their head, and/or moving a hand or finger (e.g., a device included in a VR glove device capable of detecting the motion or gesture). In response to the input, a server can obtain and/or generate VR expressions that present, on the participant VR device(s), a different position at, or within, a location, and/or different objects present at, or in, that location (e.g., a different department or location of a store, and/or different objects on different shelves within a store).

For example, a motion or gesture, and/or voice, input (or, series of inputs) can signify selecting an object on a shelf, in a collaborative VR shopping session, or can signify grasping a surgical instrument in a collaborative VR surgical procedure session. A server can respond, in an embodiment, by taking an action corresponding to the input. For example, in a collaborative VR shopping session, a server can respond to a gesture input from a participant, corresponding to selecting an object on a shelf, by obtaining and/or generating VR expressions corresponding to the participant taking the object from the shelf, and, optionally, manipulating the object (e.g., turning the object through various 3D orientations to examine it).

In another example collaborative VR shopping session, the session can include an object VR expression representing a shopping cart, and a gesture and/or voice input (or, series of inputs) from a participant can correspond to selecting an object on a shelf and placing it in a shopping cart. A server can respond to this input by obtaining and/or generating VR expressions corresponding to the participant taking the object from the shelf and subsequently placing it in the shopping cart. Other participant inputs can direct the server to perform a transaction associated with the object in the cart, such as to utilize payment resources (e.g., a credit card, or bank account), associated with one or more participants, to pay for one or more physical products corresponding to objects in the cart, and/or to arrange delivery of physical products corresponding to objects in the cart.

As previously discussed, VR expressions utilized in embodiments of a collaborative VR system can correspond to actual or, "real-world", participants, objects, locations, and/or actions associated with a task or activity. Using the example of a collaborative VR shopping session, VR expressions of an item for sale can correspond to a particular actual item for sale, and which can be purchased by a participant from a merchant and/or delivered to the participant for real-world use. Using the example of a collaborative VR surgical simulation session, VR expressions of surgical instruments, individual surgeons, and/or parts of a surgical patient, can correspond to a particular actual, physical instruments, surgeons, and/or body parts of a particular patient. In a collaborative VR session to perform an ordered procedure to produce or modify an assembly, VR expressions of components of an assembly, and/or tools used in the procedure, can correspond to actual, physical components, tools, and/or a partially or completely assembled assembly.

Accordingly, in embodiments, a collaborative VR system can perform transactions associated with actual, real-world objects represented by VR expressions in a collaborative VR session. In embodiments, a VR expression of an item for purchase can correspond to an instance of an actual, physical item for purchase, and a collaborative VR system can perform, or effect, a financial transaction to sell that instance of that actual, physical object to a participant (or, alternatively, an actual, real-world designee of a participant) in a collaborative VR session. A VR system can perform a transaction to effect a modification of an actual, real-world assembly or structure (e.g., a civil structure) resulting from an action (e.g., a task, or an action of a task, of an assembly or construction procedure) performed by a participant in a collaborative VR session, including an action performed a non-human participant (e.g., a component of a VR system) which can effect a modification of an actual, real-world assembly or structure.

To illustrate, using the example of FIG. 1B, participants 128 and 130 can jointly participate as shoppers in a collaborative VR shopping session established by collaborative VR system 120. The collaborative VR shopping session can include session VR expressions comprising a merchant location and items for purchase at that location, and can further include a shopping cart associated with one or each of participants 128 and 130. One of participants 128 and 130 can generate, using a VR device among respective VR device sets 128 and 130, an input (e.g., a voice command and/or gesture or motion) that selects an VR expression, in the collaborative VR session, representing an item for purchase. The input, and/or subsequent additional inputs, can further signify placing the selected item for purchase in an object VR expression of a shopping cart associated with one (or, alternatively, both) of participants 128 and 130. The object VR expression, in the corroborative VR shopping session, of the item for purchase can correspond to an actual item for purchase (e.g., an actual, real-world instance of the item stocked by an actual, real-world merchant), and the collaborative VR system can facilitate one, or both, of participants 128 and 130 performing transactions to pay for, and/or arrange delivery of, the actual instance of the item for purchase to one or both of participants 128 and 130.

In embodiments, a collaborative VR system, such as 120, can perform, or facilitate performing, other transactions associated with an object VR expression in a collaborative VR session, and/or an actual object corresponding to an object VR expression in a collaborative VR session. For example, a collaborative VR system can receive input from participants, via participant VR devices, that direct the VR system to apportion fractions of the purchase price of an actual, real-world item, represented in a collaborative VR shopping session by an object VR expression, among multiple participants in the collaborative VR shopping session. A collaborative VR system can receive input from participants, (e.g., via participant VR devices) that directs the VR system to allocate (e.g., place in an object VR expression of a shopping cart) one or more instances of a particular actual, real-world item, represented by an object VR expression of the item, and to subsequently perform financial transactions to complete a real-world purchase and/or delivery of such items.

It would be apparent to one of ordinary skill in the art that a collaborative VR system can perform, or facilitate performing, any transaction (e.g., financial, assignment of ownership, registration in a ledger) that can be normally associated with an actual object, or service corresponding to a VR expression of that actual object, or service, in a collaborative VR session. Further, while not shown in FIG. 1B, it would be apparent to one or ordinary skill in that art that a collaborative VR system can host a plurality of participants more than the two participants (128 and 130) described in illustrating the example of FIG. 1B; that a collaborative VR system can host a plurality of collaborative VR sessions; and, that each of a plurality of VR sessions can include any particular subset of participants utilizing participant VR devices connected within the collaborative VR system.

Figure 2:
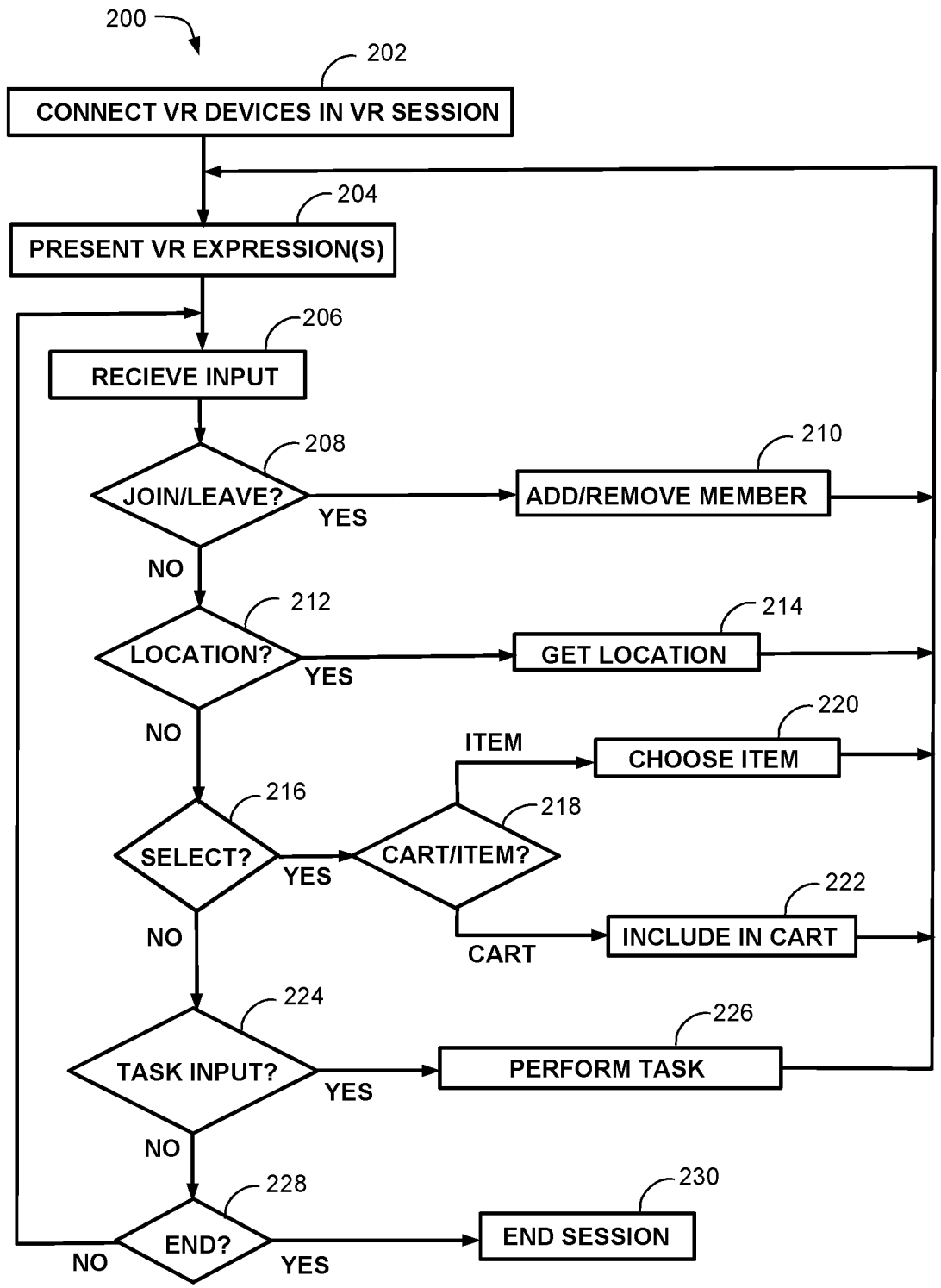
FIG. 2 is a flowchart illustrating an example method of performing a collaborative activity in a collaborative VR session, according to aspects of the disclosure.

Embodiments can comprise a computer-implemented method to perform a collaborative activity. FIG. 2 illustrates example method 200 for participants in a collaborative activity to perform the activity using a computer-implemented collaborative VR system. To illustrate the method, but not intended to limit embodiments, VR collaborative activity method 200 is described in terms of participants performing a collaborative shopping activity performed utilizing a collaborative VR session. Further, to illustrate the method, but also not intended to limit embodiments, method 200 is described utilizing a collaborative VR system (hereinafter, with reference to FIG. 2, "the VR system") comprising computing and VR devices of the foregoing examples of FIGS. 1A and 1B. In particular, the method is described as utilizing a VR server, VR collaborative activity database, and VR devices comprising, for each participant, a VR visual device, a VR audio device, and a VR voice device, such as the examples FIGS. 1A and 1B. The participant VR devices can be further understood, without limiting embodiments, to be connected to the VR server by means of a network, such as the example of network 220, connecting VR devices among VR device sets 128 and 130, in FIG. 1B.

At 202 of method 200, the VR system connects VR devices (e.g., among VR device sets 128 and 130) in a collaborative VR session (hereinafter, with reference to FIG. 2, "the VR session").

At 202, an embodiment can include participants communicating with the VR system by means of one or more computing and/or VR devices (hereinafter, with reference to FIG. 2, "a participant"), such as VR devices among VR device sets 128 or 130. In embodiments, the VR system can establish the VR session (e.g., connect VR devices and associate them with a VR session) in response to an input from a participant, which can be an input from a computing device (e.g., a laptop computer, a mobile device such as a smartphone or tablet, etc.), an input from a VR device (e.g., a voice command, a motion, or a gesture), and/or a combination of such inputs signifying, to the VR system to establish the VR session. The input(s) can indicate, for example, particular participants to include in the VR session, and/or a location at which to initiate the VR session, such as a merchant location, which can correspond to, for example, a merchant World Wide Web (hereinafter, "web") site on the Internet, or a physical merchant store or department within a physical merchant store.

In embodiments, 202 can include connecting participants (e.g., by connecting VR devices used by participants) participating in the VR session to a server (e.g., 124 in FIG. 1B), and/or to each other. Connecting participants in a collaborative VR session can enable participants to communicate with each other while participating in the VR collaborative activity. For example, connecting participants in a VR session, at 202, can include connecting participants in a telephonic and/or web conference and the conference can enable participants to communicate with, or amongst, each other in the VR session. Connecting participants can include presenting (e.g., at 204 of method 200) to a participant, a session VR expression including participant VR expressions representing one or more other participants in the VR session. In embodiments, a method of VR collaborative activity can include connecting participant computing and/or participant VR devices, by means of a network, such as the example of VR system 120 in FIG. 1B.

At 204, the VR system presents one or more VR expressions (e.g., session VR expressions, and/or component VR expressions of a session VR expression), associated with the VR session, to one or more VR devices of a participant or, alternatively, of a plurality of participants. The VR devices can, in turn, present the VR expressions to the respective participant(s). The VR expression(s) can include, for example, visual and/or auditory VR expressions corresponding to, or associated with, for example, participants in the VR session, a location within the VR session, and/or objects of the collaborative activity in the VR session. The VR expressions can include any of a variety of VR expressions, presented on one or more participants' VR devices, such as previously described. As previously discussed, the VR expressions, individually or taken in combination, can present a participant with an impression of examining an object at a location of the collaborative activity, and can include VR expressions of participants included in the VR session so as to present the participants with an impression of performing the activity together (e.g., collaborating on a shopping activity).

In embodiments, a VR system can utilize a VR collaborative activity database, such as database 126 in the example of FIG. 1B, to obtain and/or generate VR expressions to present on participant VR devices. As previously described, a VR system can obtain information about a participant, a location, and/or objects at a location from a VR collaborative activity database. The information can comprise VR expressions (e.g., visual VR expressions of a participant) or, alternatively, can comprise information to enable a VR system to generate a VR expression. It would be apparent to one of ordinary skill in the art to include in a VR collaborative activity database, or otherwise make available for use in a method of VR collaborative activity, VR expressions and/or information to generate VR expressions for display on participant VR devices representative of the environment, activity and/or tasks, and/or objects associated with that particular collaborative activity.

At 206, the VR system receives an input, which, in embodiments, can be an input from a participant device, such as a participant computing and/or VR device such as previously described in reference to 202. At 208, the VR system determines if the input at 206 corresponds to a command, or directive, to join a particular participant into the VR session or, alternatively, for a particular participant participating in the VR session to leave the session. If so, at 210, the VR system adds to the VR session, or removes from the VR session, the participant indicated with the input. In embodiments, an input, at 206, to join or leave a VR session can be an input from the particular participant joining or leaving the VR session, or can be an input from a different participant (e.g., a friend participating in the VR session to add another friend into the session) to add or remove that particular participant from the VR session.

In response to adding or removing a participant in the VR session, at 210, the VR system, at 204, presents to participant VR devices VR expressions corresponding to the change in participants. For example, in an embodiment, in response to a participant joining a VR session, at 204, the VR system can present to participant VR devices VR expressions representing the newly added participant (e.g., a visual VR expression representing the participant), The VR expressions presented at 204 can include, for example, VR expressions representing a position of a newly joined participant within a location VR expression of the VR session. Alternatively, in embodiments, in response to a participant joining a VR session, at 204, the VR system can present to participant VR devices VR expressions no longer including the former participant, such as VR expressions representing a location of the VR session in which the former participant is no longer present.

If, at 208, the input at 206 is not an input to join or leave the VR session, at 212 the VR system determines if the input corresponds to, or is associated with, a particular location of the VR session. In an embodiment, the input at 206 can signify, for example, a directive (e.g., a VR device voice command, gesture, or motion) to "go to", and/or modify, a location of the VR session, such as a particular merchant store, a department of a merchant store, a fitting room within a merchant store, etc. The input can signify to locate one or more participants at that location.

In response to the input, in an embodiment, at 214, the VR system can obtain and/or generate VR expressions representing a subject location of the input. At 204, in an embodiment the VR system can present, to participant VR devices, VR expressions representing the location, and/or elements of a location (e.g., a display of items for purchase at a location, an operating table having a patient for a surgical procedure, a table of components to assemble, etc.) corresponding to, or associated with, the input.

If, at 212, the input at 206 is not an input associated with a location, at 216 the VR system determines if the input is to select an object associated with the VR session (e.g., an object included in the VR expression(s) presented at 204). Using, again, the example of a collaborative VR shopping session, at 206 the input can, in an embodiment, select an item for purchase and/or a shopping cart (e.g., a shopping cart in a conventional sense or, alternatively, any means to associate a set of items for purchase) in which to include the item. Accordingly, at 218, if the VR system determines that the selection input received at 206 signifies an object, at 220 the VR system selects the object, and at 204, in an embodiment, the VR system can present a VR expression including the object. For example, at 206, can receive an input signifying a participant selecting an item for purchase from a display at a merchant location, as represented in the VR expression presented at 204, at the 220 the VR system can select the item and at 204 the VR system can present VR expressions representing, for example, a participant holding the item for inspection. However, this is only to illustrate the method and not intended to limit embodiments. It would be apparent to one of ordinary skill in that art that, at 212, any of a variety of objects associated with a particular type of collaborative activity to perform an ordered procedure (e.g., a surgical or assembly procedure, or a construction project) can be the subject of an input to select an object associated with the VR session.

Continuing with the example of a collaborative VR shopping session, if the VR system determines, at 218, that the input at 206 signifies including an item in a shopping cart, at 222 the VR system associates the item with the shopping cart and, at 204, the VR system can, in an embodiment, present a VR expression representing the item included in the shopping cart. The input at 206 can, in an embodiment, signify a shopping cart associated with a particular participant or, alternatively, a shopping cart associated with a plurality of participants. At 204, in an embodiment the VR system can present, to participant VR devices, VR expressions representing the shopping cart corresponding to, or associated with, the input. In embodiments, the VR expressions can include VR expressions representing the shopping cart in association with a VR expression of, for example, a particular participant, or a group of participants, such as a participant VR expression of a participant holding, or pushing, an object VR expression of the shopping cart within a location VR expression of a store location. At 204, in embodiments the VR system can present, to participant VR devices, VR expressions representing the shopping cart corresponding to, or associated with, the input containing, and/or including the object selected by, or with, the input.

While the foregoing descriptions of 218, 200, and 222 are with reference to a collaborative shopping activity performed in a collaborative VR session, it would be apparent to one of ordinary skill in the art to modify subject and or operations of 218, 220, and/or 220, and VR expressions presented at 204, according to the particulars of alternative collaborative activities, within the scope of method 200. For example, in a simulation of a surgical procedure, at 218, the input at 206 can select a VR expression representing, for example, a particular organ in a patient's body, or a surgical instrument.

At 218, in an embodiment, the VR system can determine other characteristics of the input and, at 220 and/or 222, take actions particular to those characteristics. For example, at 218 the VR system can determine the selection input identifies, for example, an organ versus a surgical instrument and surgical tray. If the former, at 220 the VR system can select the organ and at 204, the VR system can present a VR expression representing, for example, a surgeon having selected the organ. Conversely, if at 218 the VR system determines that the selection input signifies an instrument and surgical tray, at 222 the VR system can include the instrument in the surgical tray and, at 204, the VR system can present a VR expression representing the instrument include in the surgical tray.

If at 216, the input at 206 is not a selection input, at 224 the VR system determines if the input, at 206, is a transaction input. If so, at 226 the method includes performing a transaction signified by the input. At 204, in response to performing the transaction at 226, in an embodiment the VR system can present to participant VR devices a VR expression representing performing the transaction. In embodiments, the transaction can correspond for example, to a financial transaction associated with an object in a collaborative VR shopping session, application of a surgical instrument to a patient in a collaborative VR medical procedure session, or application of a tool to a component of a structure or an assembly, in a collaborative VR session. It would be apparent to one of ordinary skill in the art that, in embodiments, a transaction, at 224, can correspond to any action associated with the particular collaborative activity performed in a collaborative VR session.

Further, as previously described, in embodiments VR expressions presented to participant VR devices, in a collaborative VR session, can correspond to actual people, places, and/or actual objects. Accordingly, at 226, an embodiment can include a VR system performing, at 226, an actual transaction involving actual, real-world objects and/or actions corresponding to a transaction associated with VR expressions of the actual objects and/or actions in the VR session. For example, in a collaborative VR shopping session a VR system, in an embodiment, at 226 can perform an actual financial transaction (e.g., transferring funds among actual financial institutions). In a collaborative VR shopping session, at 226 a VR system performing a transaction, in an embodiment, can include transferring an item for purchase from one participant's shopping cart (or, a common shopping cart) to a shopping cart associated with another participant for that other participant to later purchase the item, or to divide payment of an item among several participating participants.

In an example collaborative VR medical procedure session, a transaction in an embodiment can include, for example, at 226 removing a failing organ from a patient, in which the VR expression of the organ, presented at 204, corresponds to the particular actual organ of a real-world patient, such that the surgeon, operating as a participant in the VR session, performs the removal, in the VR session, as if actually performing the procedure on the real-world patient (e.g., to practice the procedure in the VR session so as to minimize risk of the procedure when subsequently performed in the real world).

In an example collaborative VR session performing an ordered procedure directed to construction of a civil structure, in an embodiment at 224 a transaction input can signify, for example, drafting, or modifying, a VR expression of a blueprint associated with performing, in the VR session, tasks of the collaborative activity. Drafting or modifying a blueprint can be a result of performing a construction procedure (e.g., practicing or training to construct a structure) in a collaborative VR session. Correspondingly, at 226 a VR system can perform the transaction by modifying an actual blueprint to use in actually performing the project at a physical construction site.

In another example, a collaborative VR session can comprise participants collaboratively performing an ordered assembly procedure to produce, or modify, an assembly. A transaction of an assembly procedure can include, for example, the VR system drafting, or modifying, assembly instructions associated with the assembly. A transaction can comprise performing a task to modify the assembly, such as to incorporate a component into the assembly. Drafting or modifying assembly instructions, and/or modifying the assembly, can be a result of performing the procedure (e.g., practicing or training to assemble a machine or article of manufacture) in a collaborative VR session.

It would be apparent to one of ordinary skill in the art that, in embodiments, a transaction input, at 206, can correspond to any actual transaction, task of a procedure, and/or action, that can be performed with respect to a particular actual object (e.g., an assembly or structure) and/or activity of a procedure performed in a collaborative VR session. Correspondingly, it would be apparent to one of ordinary skill in the art that at 226 performing a transaction associated with the input can comprise a VR system performing some, or all, of the actions, or tasks of a procedure (such as an assembly or construction procedure), to complete the transaction, or action, in the real world. It would be also apparent to one of ordinary skill in the art that, in embodiments, at 204 to present to participant VR devices VR expressions representing performing the transaction and/or tasks of a procedure.

If, at 224, the input at 206 is not a transaction input, at 228, the VR system determines if the input signifies to conclude, or end, the VR session. If so, at 230 the VR system ends, or otherwise concludes operations of the VR session. Ending the VR session, in embodiments, can include performing pending or incomplete actual transactions, such as those just described in reference to 224 and 226. Pending or incomplete transactions can correspond, in embodiments, to transactions associated with real-world objects, and/or real-world actions, represented, in the VR session, by VR expressions of the actual objects and/or actions. Embodiments can include, at 230, completing these real-world transactions in regard to the real-world objects and/or actions. Ending the VR session, in embodiments, can include, at 230, terminating an interconnection of participants participating in the VR session, such as terminating a telephonic or web conference interconnecting the participants.

In another example, in an embodiment ending a VR session can include modifying VR expressions included in a VR session to represent new locations, participants, and/or object disassociated from the former VR session (e.g., modifying location VR expressions presented to a former participating participant's VR device(s) to be VR expressions representing a different location, and/or different participants at a location). Ending the session can, accordingly, further include presenting to participant VR devices the modified VR expressions.

It would be apparent to one of ordinary skill in the art that ending a VR session, at 230, can include, in embodiments, modifying any of a variety of VR expressions, and presenting the modified VR expressions to participant VR devices, to appropriately represent that a former VR session is no longer in progress. It would be further apparent to one of ordinary skill in the art that, at 230, ending a VR session, alternatively, can include, in embodiments, terminating connections of participant VR devices to other components of a VR system, such as a server and/or other participants' VR devices.

While the example method of FIG. 2 is described in the context of collaborative VR session involving shopping, medical, construction, and or assembly procedures, it would be apparent to one of ordinary skill that embodiments are not limited to such collaborative activities. Accordingly, it would be evident to one of ordinary skill in the art to modify actions and/or objects of methods of the disclosure, such as example method 200, according to the particular aspects of alternative collaborative activities, procedures, and/or tasks of a procedure performed using a collaborative VR session and/or collaborative VR system.

Figure 3:
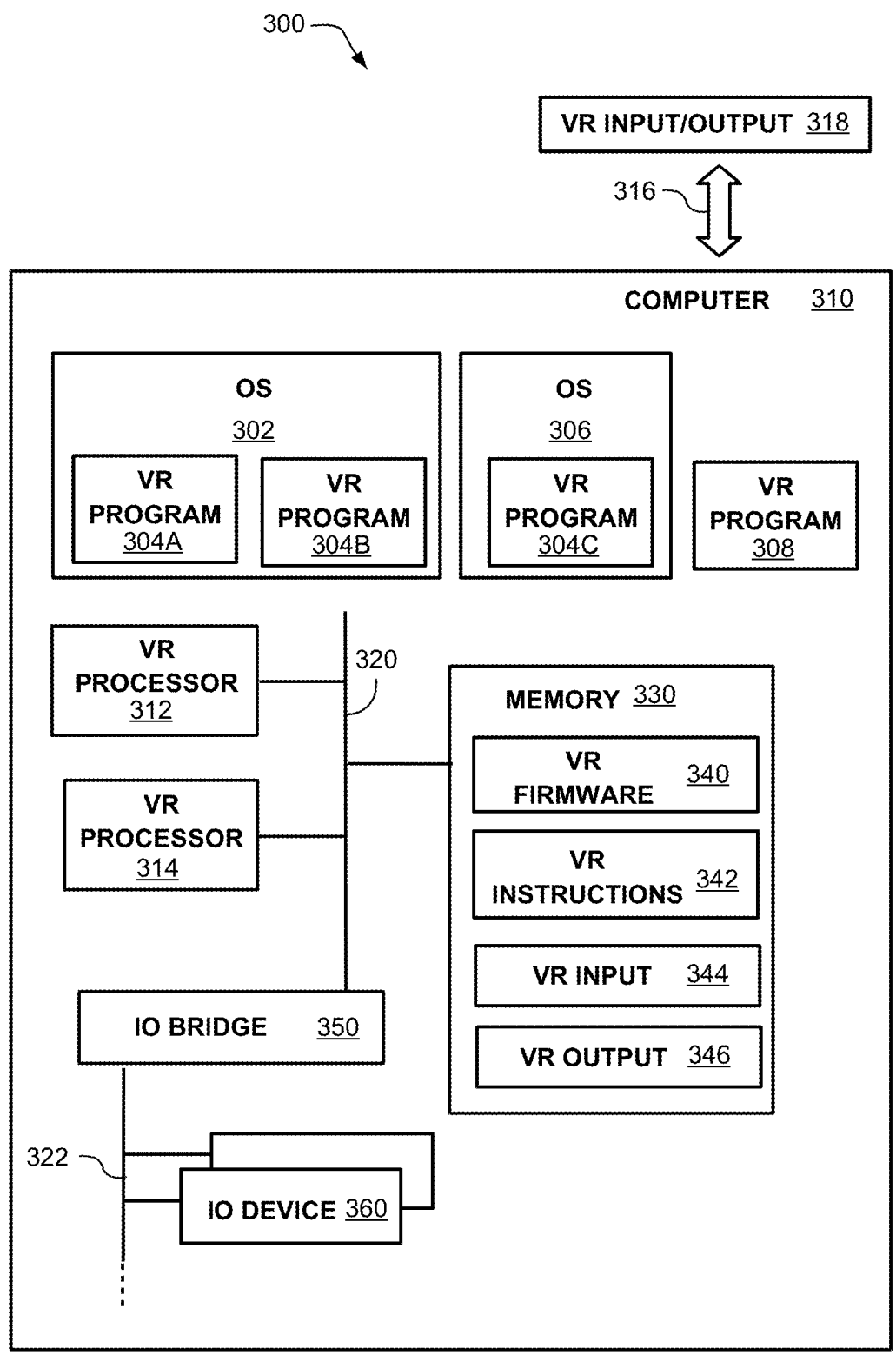
FIG. 3 is a block diagram illustrating an example computing system, according to aspects of the disclosure.

A method of performing a collaborative activity in a collaborative VR session, such as example method 200, can be performed in whole or, alternatively, in part, by one or more computing systems and/or devices (hereinafter, "computers"). A collaborative VR system can include a computing system and/or a computer. FIG. 3 illustrates example computing system 300, which comprises computer 310 communicatively coupled to VR input/output (IO) 310 by interface 316. In an embodiment, a computing system, such as 300, and/or components thereof (e.g., computer 310, and/or VR IO 318), can comprise a component of a collaborative VR system, and/or can perform aspects and/or operations of a computer-implemented method for performing a collaborative VR activity, such as method 200. For example, in embodiments a server, and/or a VR collaborative activity database, included in a collaborative VR system, can comprise computing system 300 and/or components thereof. In another example, a VR device for performing the method, in embodiments, can comprise a computing system, such as 300, or components thereof.

As shown in FIG. 3, computer 310 includes VR processors 312 and 314. In embodiments, VR processors can be a single processor or a multi-threaded processor, a general purpose or a special purpose processor, a co-processor, or any of a variety of processing devices that can execute computing instructions. Interface 316 couples computer 310 to VR IO 318. In embodiments, VR IO 318 can comprise one or more devices capable of presenting VR expressions, and/or capable of communicating inputs to a collaborative VR system (or, component thereof), such as previously described in reference to FIGS. 1A, and 1B. VR IO 318, in embodiments, can be a server, or a collaborative activity database, for example.

Interface 316 can enable computer 310, in embodiments, to send VR output data to components of a collaborative VR system (e.g., to send VR expressions to VR devices, or to send VR session information from a VR database to a VR server), and/or to receive VR input data (e.g., to receive inputs from VR devices, or to receive VR session information from a VR database). In embodiments, interface 316 can be, for example, a network (e.g., an intranet, or a public network such as the Internet, such as network 122 previously described in reference to FIG. 1B), or a storage medium, such as a disk drive internal to, or connected to, computer 310. As previously described in reference to FIG. 1B, in embodiments, interface 316 can be a direct coupling between VR input/output 318 and computer 310. Interface 316 can be configured to enable human input, VR device input, or to couple computer 310 to other input devices, such as described later in regard to components of computer 310. It would be apparent to one of ordinary skill in the art that the interface can be any of a variety of interface types or mechanisms suitable for a computer, or a program operating in a computer, to receive or otherwise access or receive a source netlist.

VR processors 312 and 314 are shown in FIG. 3 connected by memory interface 320 to memory 330. In embodiments a memory can be a cache memory, a main memory, a flash memory, or a combination of these or other varieties of electronic devices capable of storing information and, optionally, making the information, or locations storing the information within the memory, accessible to a VR processor. A memory can be formed of a single electronic (or, in some embodiments, other technologies such as optical) module or can be formed of a plurality of memory modules. In embodiments, a memory, or a memory module (e.g., an electronic packaging of a portion of a memory), can be, for example, one or more silicon dies or chips, or can be a multi-chip module package. Embodiments can organize a memory as a sequence of bytes, words (e.g., a plurality of contiguous or consecutive bytes), or pages (e.g., a plurality of contiguous or consecutive bytes or words).

In embodiments, a computer, such as 310, can include a plurality of memories. A memory interface, such as 320, between a VR processor (or, processors) and a memory (or, memories) can be, for example, a memory bus common to one or more VR processors and one or more memories. In some embodiments, a memory interface, such as 320, between a VR processor and a memory can be point to point connection between the VR processor and the memory, and each VR processor in the computer can have a point-to-point connection to each of one or more of the memories. In other embodiments, a VR processor (for example, 312) can be connected to a memory (e.g., memory 330) by means of a connection (not shown) to another VR processor (e.g., 314) connected to the memory (e.g., 320 from VR processor 314 to memory 330).

In embodiments, a computer can include an IO bridge, which can be connected to a memory and/or VR processor by a memory interface, such as illustrated in FIG. 3 by IO bridge 350 connected to VR processors 312 and 314, and memory 330, by means of memory interface 320. In alternative embodiments (not shown in FIG. 3), an IO bridge, such as 350, can be connected to a VR processor by an interface other than a memory interface. In embodiments, an IO bridge can be a component of a VR processor or a memory.

An IO bridge can interface the VR processors, and/or memories, of the computer (or, other devices) to IO devices connected to the bridge. As shown in the example of FIG. 3, IO bridge 350 can interface memory interface 320 to IO devices, such as IO device 360, connected to IO bridge 350 by an IO interface, shown in FIG. 3 as 322. In some embodiments, an IO bridge can connect directly to a VR processor or a memory, or can be a component included in a VR processor or a memory.

In embodiments, interface 322 can be any of a variety of IO interfaces, such as IO buses, and IO devices, such as 360, can be any type of device or IO adapter that can connect to such an IO bus. For example, interface 322, in an embodiment, can be an IO bus, such as a PCI-Express (PCI-E) bus, and IO bridge 350 can, correspondingly, be a PCI-E bridge, and IO device 360 can be a PCI-E device (e.g., a disk drive), or PCI-E adapter (e.g., a network interface card, or a disk adapter). In embodiments, IO devices can be any of a variety of peripheral IO devices or IO adapters connecting to peripheral IO devices. For example, IO device 360 can be a graphic card, keyboard or other input device, a hard drive or other storage device, a network interface card, etc. IO devices, like 360, in embodiments, can be VR devices, such as those described in FIGS. 1A and 1B.

A computer, such as 310, can include instructions executable by one or more of the VR processors (or, processing elements, such as threads of a VR processor). The instructions can be a component of one or more programs. The programs, or the instructions, can be stored in, and/or utilize, one or more memories of a computer. As illustrated in the example of FIG. 3, computer 310 includes a plurality of programs, such as VR programs 304A, 304B, 304C (collectively, "VR programs 304"), and 308, and operating systems OS 302 and 306.

In embodiments, a VR program can be, for example, an application program (e.g., an application for generating VR expressions), a function of an operating system (e.g., a device driver capable of operating an IO device, such as 360), or a utility or built-in function of a computer, such as 310. A VR program can be a hypervisor, and the hypervisor can, for example, manage sharing resources of the computer (e.g., a VR processor or regions of a memory, or access to an IO device) among a plurality of programs or OSes. A VR program can be a program that embodies the methods, or portions thereof, of the disclosure. For example, a VR program can be a program that executes on a VR processor of computer 310 to perform the example method 200 of FIG. 2, or portions and/or modifications thereof, within the scope of the disclosure.

VR programs can be "stand-alone" programs that execute on VR processors and use memory within the computer directly, without requiring another program to control their execution or their use of resources of the computer. For example, computer 310 includes stand-alone VR program 308. A stand-alone VR program can perform particular functions within the computer, such as controlling, or interfacing (e.g., access by other programs) an IO interface or IO device. A stand-alone VR program can, for example, manage the operation, or access to, a memory. A Basic I/O Subsystem (BIOS), or a computer boot program (e.g., a program that can load and initiate execution of other programs) can be a standalone program.

In embodiments, a computer, such as computer 310, can include one or more operating systems, and an operating system can control the execution of other programs (e.g., VR programs, firmware, and/or instructions) such as, for example, to start or stop a program, or to manage resources of the computer used by a program. For example, in computer 310 operating systems OS 302 and/or 306 can include, or manage execution of, one or more programs, such as OS 302 managing execution of VR programs 304A and/or 304B, and OS 306 managing execution of VR program 304C. In some embodiments, an operating system can function as a hypervisor.

A VR program can be embodied as firmware (e.g., BIOS in a desktop computer, or a hypervisor) and the firmware can execute on one or more VR processors and, optionally, can use memory, included in the computer. Firmware can be stored in a memory (e.g., a flash memory) of the computer. For example, computer 310 includes VR firmware 340 stored in memory 330. In other embodiments, firmware can be embodied as instructions (e.g., comprising a computer program product) on a storage medium (e.g., a CD ROM, a flash memory, or a disk drive), and the computer can access the instructions from the storage medium.

In embodiments, a computer can include instructions to perform methods of a collaborative VR activity, such as example method 200 of FIG. 2, or portions and/or modifications thereof. For example, in computer 310, VR programs 304 and/or VR program 308 can comprise VR instructions 342, which can execute (e.g., on one or both of VR processors 312 and 314) to perform operations of example method 200 of FIG. 2, or portions and/or modifications thereof. VR instructions 342, in embodiments, can operate on VR input (e.g., inputs received from VR IO 318, such as VR device inputs) stored in a memory, such as VR input 344 in memory 330. In embodiments, VR instructions 342 can store the results of executing the instructions (e.g., VR expressions obtained and/or generated by the instructions) in VR output 346, in memory 330.

The example computing system 300, and/or components thereof, are not intended to limit embodiments. In embodiments, computing system 300 can include a plurality of VR processors, memories, and interfaces; and, the interfaces can include other elements or components, such as networks, network routers or gateways, storage systems, server computers, virtual computers or virtual computing and/or IO devices, cloud-computing environments, and so forth. It would be evident to one of ordinary skill in the art to include a variety of computing devices interconnected in a variety of manners in a computing device embodying aspects and features of the disclosure.

In embodiments, computer 310 can be, for example, a computing device having a VR processor capable of executing computing instructions and, optionally, a memory in communication with the VR processor. For example, computer 310 can be a desktop or laptop computer; a tablet computer, mobile computing device, or cellular phone; or, a server computer, a high-performance computer, or a super computer. Computer 310 can be, for example, a computing device incorporated into a wearable apparatus (e.g., an object of clothing, a wristwatch, or eyeglasses), an appliance (e.g., a refrigerator, or a lighting control), a mechanical device, or (for example) a motorized vehicle. It would be apparent to one of ordinary skill in the art that a computer embodying aspects and features of the disclosure can be any of a variety of computing devices having VR processors and, optionally, memories and/or programs.

The disclosure can be embodied in a system, a method, and/or a computer program product at any possible technical detail level of integration. In embodiments, a computer program product can include a computer readable storage medium (or media) having computer readable program instructions thereon for causing a processor to carry out aspects of the disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In embodiments, computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the disclosure can be, in embodiments, assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages.

The computer readable program instructions can, in embodiments, execute entirely on the participant's computer, partly on the participant's computer, as a stand-alone software package, partly on the participant's computer and partly on a remote computer or entirely on the remote computer or server. In the latter scenario, the remote computer can be connected to the participant's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosure.

Aspects of the disclosure are previously described herein with reference to flowchart illustrations (e.g., FIG. 2) and/or block diagrams (e.g., FIGS. 1A, 1B, and 3) of methods, apparatus and/or systems, and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored, in an embodiment, in a computer readable storage medium that can direct a computer, a programmable data processing apparatus, and/or other devices to function in a particular manner, such that the computer readable storage medium having instructions stored therein comprises an object of manufacture including instructions which implement aspects of the function/act specified in the flowchart and/or block diagram block or blocks.

The computer readable program instructions can also be loaded, in embodiments, onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosure. In this regard, each block in the flowchart or block diagrams can represent a module, segment, or portion of instructions, which comprises one or more executable instructions for implementing the specified logical function (s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

connecting, by a computer-implemented virtual reality (VR) system, a plurality of VR devices in a collaborative VR session, wherein participant VR devices, among the plurality of VR devices connected in the collaborative VR session, are associated with participants included in a collaborative activity to perform an ordered procedure directed to a real-world assembly, the collaborative activity comprising an activity to train a first participant, among the participants included in the collaborative activity, to perform a first task of the ordered procedure;

receiving, by the VR system, from a first VR device among the participant VR devices, a first session input, the first VR device associated with a second participant among the participants in the collaborative activity, the first session input comprising an action of the second participant directed to a virtual object, the virtual object included in a VR expression of the collaborative VR session, the virtual object representative of the real-world assembly, the action of the second participant corresponding to a second task of the ordered procedure, the second task directed to producing a first modification of the virtual object;

receiving, by the VR system, from a second VR device among the participant VR devices, a second session input, the second VR device associated with a third participant among the participants included in the collaborative activity, the third participant different from the second participant, the second session input comprising an action of the third participant directed to the virtual object, the action of the third participant corresponding to a third task of the ordered procedure, the third task directed to producing a second modification of the virtual object; and, performing, by the VR system, in the collaborative VR session, in response to the receiving the first and the second session inputs, a transaction directed to the virtual object, the VR system performing the transaction producing a first and a second modification of the real-world assembly, the first modification of the real-world assembly corresponding to the first modification of the virtual object, and the second modification of the real-world assembly corresponding to the second modification of the virtual object.

2. The method of claim 1, wherein the ordered procedure comprises a procedure to construct a real-world instance of the real-world assembly.

3. The method of claim 1, wherein the second session input is responsive to the first session input.

4. The method of claim 1, wherein the VR system comprises a component of the VR system configured to manipulate the real-world assembly; and,
   wherein, in response to the VR system performing the transaction, the component produces at least one of the first and the second modifications of the real-world assembly.

5. The method of claim 1, wherein a participant, among the participants in the collaborative activity, comprises a non-human participant.

6. A VR system comprising:
   a computer implemented virtual reality (VR) server;
   a VR system input device communicatively coupled to the VR server; and,
   a plurality of VR devices communicatively coupled to the VR server, wherein the VR server is configured to:
   receive, from the VR system input device, a request to connect participant VR devices, among the VR devices communicatively coupled to the VR server, in a collaborative VR session, wherein the participant VR devices are associated with participants included in a collaborative activity to perform an ordered procedure directed to a real-world assembly, the collaborative activity comprising an activity to train a first participant, among the participants included in the collaborative activity, to perform a first task of the ordered procedure;
   connect, in response to the request, the participant VR devices in the collaborative VR session;
   receive, from a first VR device, among the participant VR devices connected in the collaborative VR session, a first session input, the first VR device associated with a second participant among the participants in the collaborative activity, the first session input comprising an action of the second participant directed to a virtual object included in a VR expression of the collaborative VR session, the virtual object representative of the real-world assembly, the action of the second participant corresponding to a second task of the ordered procedure, the second task directed to producing a first modification of the virtual object;
   receive, from a second VR device among the participant VR devices connected in the collaborative VR session, a second session input, the second VR devices associated with a third participant among the participants in the collaborative activity, the third participant different from the second participant, the second session input comprising an action of the third participant directed to the virtual object, the action of the third participant corresponding to a third task of the ordered procedure, the third task directed to producing a second modification of the virtual object; and,
   perform, in the collaborative VR session, in response to the receiving the first and the second session inputs, a transaction directed to the virtual object, wherein the VR system performing the transaction produces a first and a second modification of the real-world assembly, the first modification of the real-world assembly corresponding to the first modification of the virtual object, the second modification of the real-world assembly corresponding to the second modification of the virtual object.

7. The collaborative VR system of claim 6, wherein the ordered procedure comprises a procedure to construct a real-world instance of the real-world assembly.

8. The VR system of claim 6 wherein the second session input is responsive to the first session input.

9. The VR system of claim 6, wherein the VR system further comprises a component of the VR system configured to manipulate the real-world assembly; and,
   wherein, in response to the VR system performing the transaction, the component produces at least one of the first and the second modifications of the real-world assembly.

10. The VR system of claim 6, wherein a participant, among the participants in the collaborative activity, comprises a non-human participant.

11. A computer program product, the computer program product comprising a computer readable storage medium having first program instructions embodied therewith, wherein the computer readable storage medium is not a transitory signal per se, and wherein the first program instructions are executable by at least one processor, included in a virtual reality (VR) system, to cause the VR system to:
   connect a plurality of VR devices in a collaborative VR session, wherein participant VR devices, among the plurality of VR devices connected in the collaborative VR session, are associated with participants included in a collaborative activity to perform an ordered procedure directed to a real-world assembly, the collaborative activity comprising an activity to train a first participant, among the participants included in the collaborative activity, to perform a first task of the ordered procedure;

receive, from a first VR device among the participant VR devices, a first session input, the first VR device associated with a second participant among the participants in the collaborative activity, the first session input comprising an action of the second participant directed to a virtual object, the virtual object included in a VR expression of the collaborative VR session, the virtual object representative of the real-world assembly, the action of the second participant corresponding to a second task of the ordered procedure, the second task directed to producing a first modification of the virtual object;

receive, from a second VR device among the participant VR devices, a second session input, the second VR device associated with a third participant among the participants included in the collaborative activity, the third participant different from the second participant, the second session input comprising an action of the third participant directed to the virtual object, the action of the third participant corresponding to a third task of the ordered procedure, the third task directed to producing a second modification of the virtual object; and, perform, in the collaborative VR session, in response to the receiving the first and the second session inputs, a transaction directed to the virtual object, the VR system performing the transaction producing a first and a second modification of the real-world assembly, the first modification of the real-world assembly corresponding to the first modification of the virtual object, the second modification of the real-world assembly corresponding to the second modification of the virtual object.

12. The computer program product of claim 11, wherein the second session input is responsive to the first session input.

13. The computer program product of claim 11, wherein the ordered procedure comprises a procedure to construct a real-world instance of the real-world assembly.

14. The computer program product of claim 11, wherein the VR system comprises a component of the VR system configured to manipulate the real-world assembly; and, wherein, the computer readable storage medium further has second program instructions embodied therewith, the second program instructions executable by the at least one processor to cause the component to produce at least one of the first and the second modifications of the real-world assembly.

15. The computer program product of claim 11, wherein a participant, among the participants in the collaborative activity, comprises a non-human participant.

* * * * *